United States Patent [19]

Sweet et al.

[11] 4,033,608
[45] July 5, 1977

[54] AIR SPRING UNIT

[75] Inventors: Philip J. Sweet; Buck C. Hamlet; David L. Sweet, all of Fresno, Calif.

[73] Assignee: American Carrier Equipment, Fresno, Calif.

[22] Filed: Dec. 10, 1975

[21] Appl. No.: 639,290

[52] U.S. Cl. .................................. 280/711; 267/31
[51] Int. Cl.² .......................................... B60G 17/00
[58] Field of Search .......... 280/682, 678, 680, 711, 280/715, 706, 707, 703, 712, 713; 267/31

[56] References Cited
UNITED STATES PATENTS

| 2,903,256 | 9/1959 | Weiss | 280/711 X |
| 3,556,554 | 1/1971 | Saward | 280/712 |
| 3,866,894 | 2/1975 | Sweet | 280/712 |

Primary Examiner—Joseph F. Peters, Jr.
Assistant Examiner—R. Schrecengost
Attorney, Agent, or Firm—Huebner & Worrel

[57] ABSTRACT

An improved air spring unit adapted to be employed in modifying suspension systems for a wheeled vehicle having a cantilevered leaf spring assembly. The air spring unit is characterized by a pressurizable air bag disposed in substantial vertical alignment with a live axle, a force dissipating rocker arm having one end portion supported by the air bags, and a second end portion disposed in a supported relationship with a projected end portion of the leaf spring assembly, and a clevis connecting the midportion of the arm to a longitudinal frame member provided for the vehicle, whereby the air bag is employed in juxtaposition with the well of an adjacent wheel, so that increased radial expansion of the bag is facilitated.

2 Claims, 5 Drawing Figures

AIR SPRING UNIT

BACKGROUND OF THE INVENTION

1. Field of the Invention

The invention generally relates to suspension systems and more particularly to an improved air spring unit particularly suited for use with a spring suspension system mounted on a live axle of a type currently provided for wheeled vehicles, such as trucks and the like.

2. Description of the Prior Art

Vehicle suspension systems including coil springs, leaf springs, and the like are notoriously old. However, designers of such suspension systems have long been plagued with the perplexing problem of imparting empty-ride capabilities to such systems. That is to say, that while it is apparent that springs of sufficient rigidity can be provided for supporting a vehicle in its loaded condition, or conversely, in its unloaded condition, a perplexing problem arises when a given vehicle must be employed in its loaded and unloaded condition, alternately.

For example, a flat bed trailer or the like often is employed in delivering a load to a given destination and thereafter returned to the point of origin, or other destination, in an empty condition. Where the springs of the suspension system employed are sufficiently rigid for supporting the trailer as it is transported in its loaded condition, the springs lack sufficient resiliency for overcoming shock-loading when the vehicle is transported in its empty or unloaded condition. The destructive effects of shock-loading can readily be appreciated by those familiar with the trucking industry.

In order to overcome the aforementioned disadvantages of conventional suspension systems, attempts have been made to modify the effects of conventional systems by including air bags and the like in combination therewith. One such modified suspension system is illustrated in U.S. Pat. No. 3,866,894 which issued to Phillip J. Sweet et al., Feb. 18, 1975.

Modified systems generally have met with success, particularly when included in suspension systems for trailers and the like. However, limitations on available space for mounting air bags tend to severely restrict the mounting of relatively large air bags on live axles, particularly where the air bag must be located in the vicinity of the periphery of a wheel and the circumscribing tire.

It is, therefore, the general purpose of the instant invention to provide an improved, economic and efficient air spring unit which is particularly suited for use in modifying conventional suspension systems of the type characterized by cantilevered leaf springs mounted on live axles for vehicles whereby the aforementioned difficulties and disadvantages are substantially overcome without impairing operational capabilities of the vehicles.

OBJECTS AND SUMMARY OF THE INVENTION

It is an object of the instant invention to provide an improved air spring unit for a wheeled vehicle.

It is another object to provide an improved air spring unit particularly suited for use in modifying suspension systems characterized by cantilevered leaf springs mounted on live axles.

It is another object to provide an improved air spring unit which readily can be used in modifying suspension systems for enhancing empty-ride capabilities of vehicles equipped with cantilevered supporting members mounted on a live axle.

It is another object to provide a practical and economical air spring unit adapted to be readily employed in vehicles such as trucks, trailers, and the like, either as original equipment or in modifying existing suspension systems for imparting thereto enhanced load-bearing characteristics. These and other objects and advantages are achieved through a use of a simple, economic and practical air spring unit which is configured to be mounted immediately above a live axle in juxtaposition with a wheel well of an adjacent wheel, whereby the difficulties and disadvantages heretofore experienced because of space limitations are in large measure overcome, as will hereinafter become more readily apparent by reference to the following description and claims in light of the accompanying drawings.

DESCRIPTION OF THE PREFERRED EMBODIMENT

Figure 1:
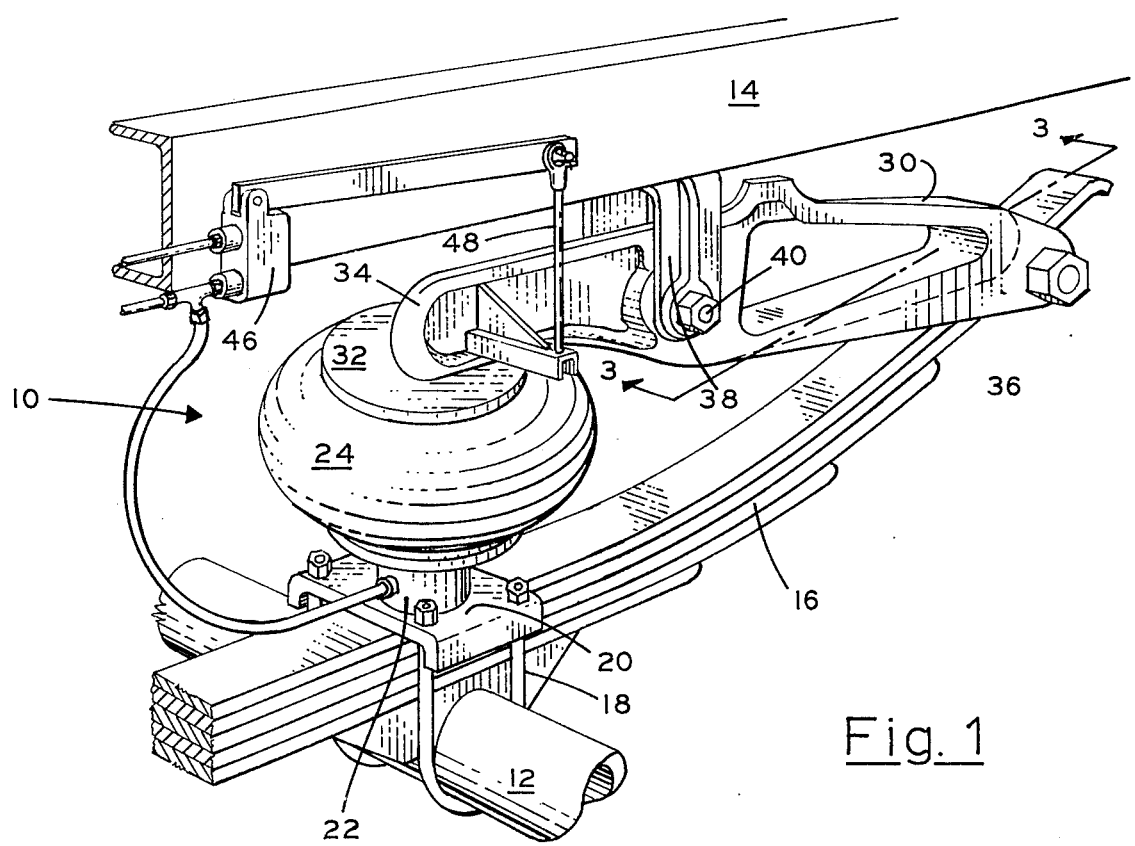
FIG. 1 is a perspective view of an improved air spring unit which embodies the principles of the instant invention, illustrating the relationship of an air bag and rocker arm provided for the unit.
Figure 5:
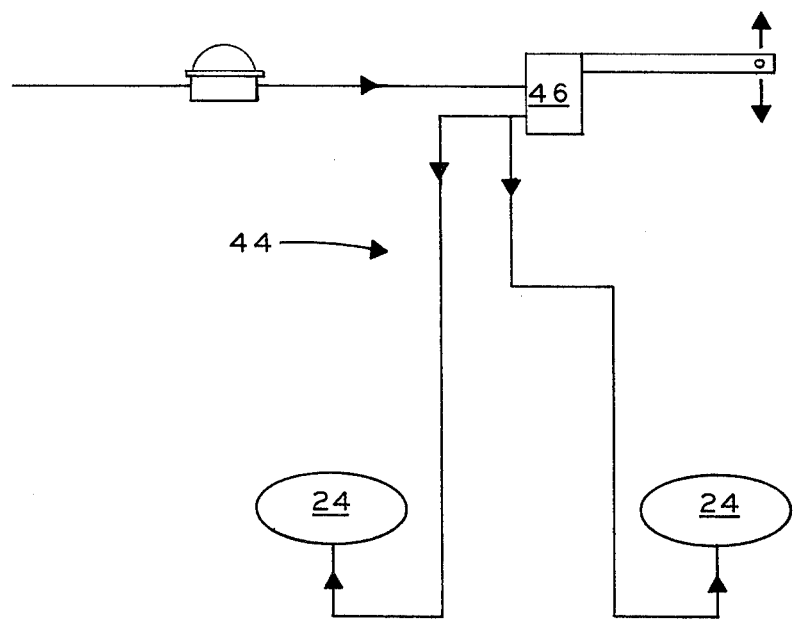
FIG. 5 is a diagrammatic view of a pneumatic circuit provided for purposes of controlling pressurization of the air bag for the air spring unit.
Figure 2:
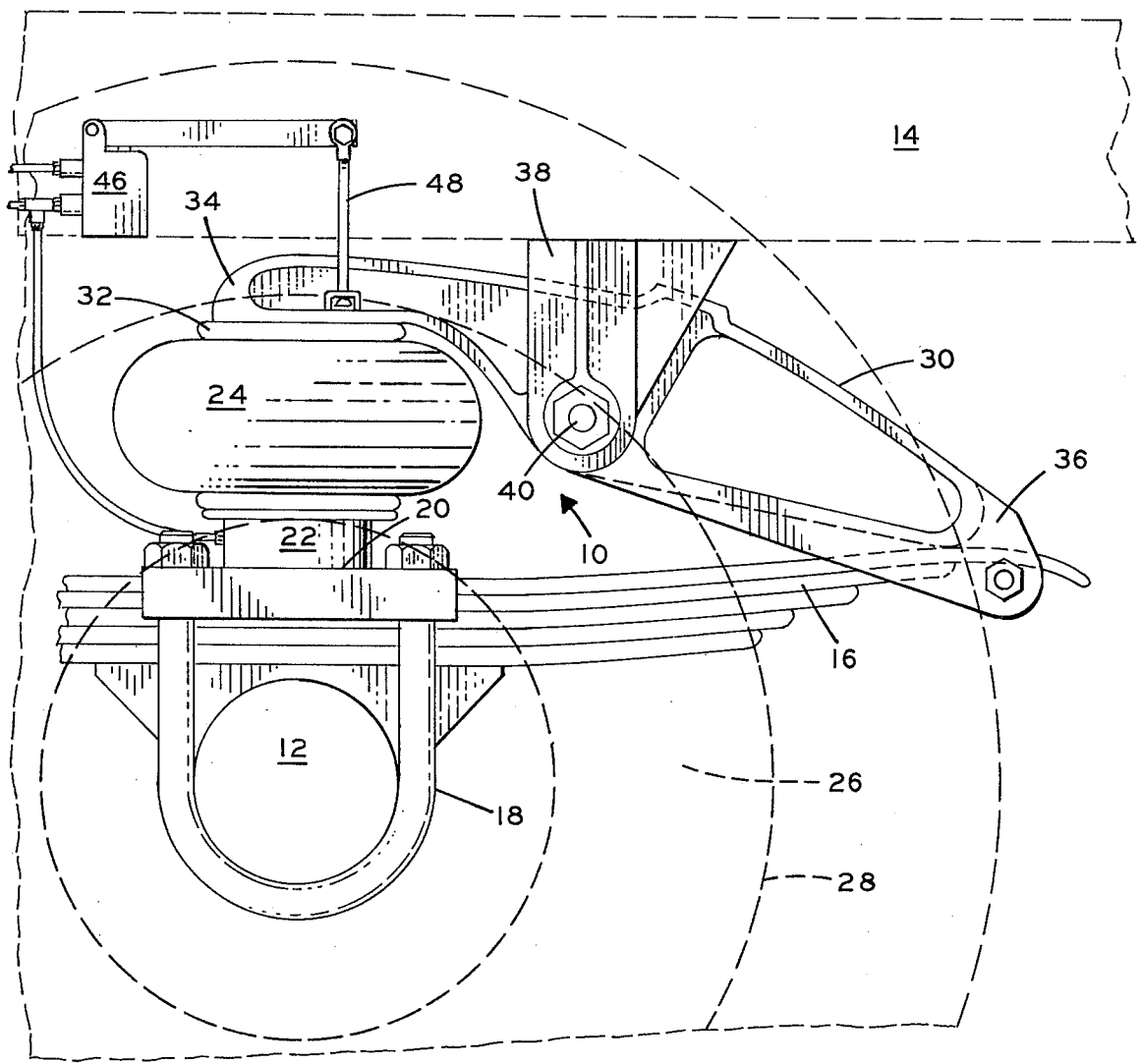
FIG. 2 is an elevational view of the unit, partially in phantom, illustrating the relationship of the air bag and rocker arm, relative to a wheel and a live axle, when included in a modified suspension system.

Referring now to the drawings wherein like reference characters designate like or corresponding parts throughout the several views, there is shown in FIG. 1 an improved air spring unit, generally designated 10, embodying the principles of the instant invention.

While the air spring unit 10 has utility with vehicles such as trailers and the like, it is to be understood that the air spring unit 10 is particularly useful in modifying conventional suspension systems mounted on live axles such as trucks, tractors, and the like since the unit 10 permits the included air bag, hereinafter more fully discussed, to be mounted adjacent to a wheel well, whereby bag-expansion limitations are less stringent.

As shown, the air spring unit 10 is supported on a live axle 12 beneath a longitudinal frame member 14 of a selected vehicle, not shown, previously equipped with a conventional cantilevered leaf spring assembly 16. The leaf spring assembly 16 is mounted on the axle 12 employing a suitable mount 18, characterized by a pillow plate 20. The pillow plate 20, in effect, extends transversely of the leaf spring assembly 16 and is secured in place by the mount 18. Seated on the pillow plate 20 is a pedestal 22 which functions as a base for an air bag 24.

The air bag 24, as shown, is mounted on the pedestal 22 in a suitable manner well understood by those familiar with the mounting of air bags. While, as illustrated, the air bag is a single convolute air bag, other bags including the so-called rolling lobe and double convolute are employed where so desired. It is important to note, however, that regardless of its configuration, the air bag 24 is disposed in juxtaposition with the wheel well 26 provided for an adjacent wheel, designated 28. Thus expansion of the air bag 24 in horizontal directions into the wheel well 26 is accommodated as compressive loading of the air bag occurs.

The air bag 24, of course, serves as a support member for the frame of the vehicle to which it is connected through a rocker arm 30. The rocker arm 30 is affixed to a plate 32 through suitable fasteners, including bolts and the like, not shown. The plate 32 is located at the top of the air bag 24 and disposed in a horizontal plane interposed between the air bag and the adjacent end portion, designated 34, of the rocker arm 30.

The opposite end portion, designated 36, of the rocker arm 30 is seated on the upper surface of the leaf spring assembly 16, while the midportion thereof is connected with the frame member 14. A vertically oriented bracket 38, welded or otherwise rigidly affixed to the frame member 14, is pivotally connected to the rocker arm by a horizontally oriented pin 40. While not shown, it is to be understood that the pin 40 is provided with suitable bushings and bearings which serve to accommodate pivotal motion of the rocker arm 30.

Figure 3:
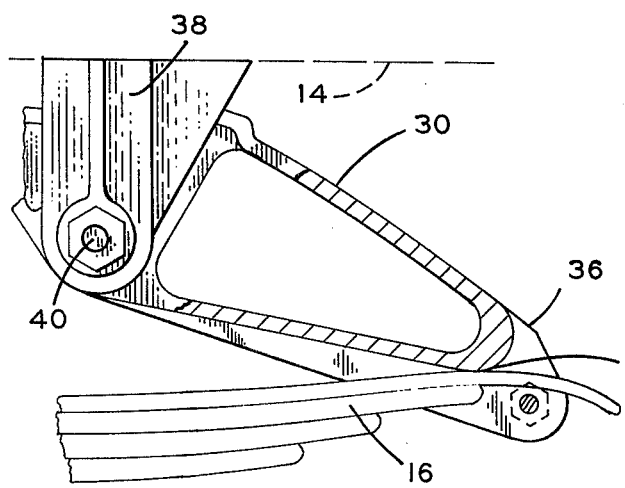
FIG. 3 is a partially sectioned fragmented view of the rocker arm shown in FIGS. 1 and 2.
Figure 4:
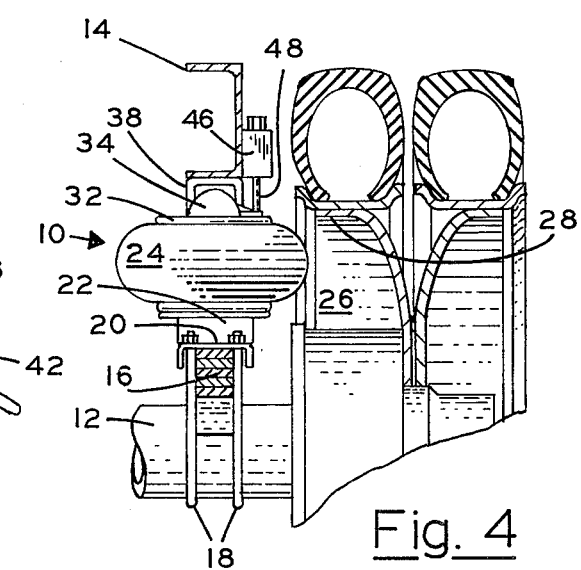
FIG. 4 is a fragmented end view of the unit, further illustrating the relationship of the air bag with the wheel.

As best illustrated in FIG. 3, the end portion 36 of the rocker arm 30 includes a shoe 42. The shoe 42 is afforded sliding motion along the upper surface of the leaf spring assembly as vertical motion is imparted to the frame member 14, relative to the leaf spring assembly.

It is important to note that the arm 30 is of a generally arcuate configuration so that the shoe 42 is located beneath the pin 40 so that the length of the moment arm acting about the axis defined by the pivot pin 40 varies as oscillating motion is imparted to the arm during the vehicle's operation.

A pneumatic circuit generally designated 44 is provided for controlling the pressure of the air bag 24. As a practical matter, a leveling valve 46, of a suitable design, is mounted on the frame member 14 and connected with the lever arm 30 through an articulated control linkage 48, whereby air under pressure, derived from a suitable source not shown, is delivered to the air bag 24 as the bag is compressed due to positive loading of the air bag, and, similarly, permits air to be discharged from the air bag as negative loading occurs. The operation of such devices is well known and understood, therefore, a more detailed description of the leveling valve is omitted in the interest of brevity.

OPERATION

It is believed that in view of the foregoing description, the operation of the device will readily be understood and it will be briefly reviewed at this point.

The air spring unit 10 is, of course, one of a pair of air spring units 10. The unit 10 is particularly suited for modifying a conventional suspension system, of the type employing leaf spring assemblies, to suspension systems which utilize an air bag in order that the desirable characteristics of an air bag be provided for the system. It is important to note that while the air spring unit 10 is particularly suited for use in modifying suspension systems adapted to be mounted on live axles the unit 10 can be included in original manufacture. Further, in view of the fact that the air bag is positioned to be received within the wheel well of an adjacent wheel, as horizontal expansion thereof occurs, a use of air bags in suspension systems for vehicles equipped with live axles is substantially enhanced.

In order to mount the air spring unit 10 on a selected vehicle, the air spring unit is interposed between a longitudinal frame member 14 and the live axle 12 of the vehicle. The air bag 24 is bolted or otherwise rigidly secured in place to the pillow plate 20, while the rocker arm 30 is pivotally coupled through the bracket 38 to the frame member. The shoe 42 is seated on the rearmost end portion of the leaf spring assembly 16 while the bag 24 is coupled with the pneumatic circuit 44. The leveling valve 46 is next connected through the articulated linkage 48 to the rocker arm.

As the vehicle, thus equipped, progresses across relatively rough terrain, the distance between the live axle 12 and the frame member 14 continuously varies as shock-induced motion is imparted to the axle through the wheels 28. As the distance between the live axle 12 and the frame member 14 varies, a variable load is transmitted to the air bag 24 through the rocker arm 30 for thus causing the air bag 24 to vary its dimensions, both vertically and horizontally, in response to the changes in externally applied pressure. Due to the fact that the bag 24 is positioned adjacent to the wheel well 26, the bag 24 is permitted to expand into the wheel well. The pressure within the bags is, of course, controlled through the articulated linkage 48 which serves to actuate the valve 46. As the valve 46 is actuated, air under pressure is introduced into the bag as the bag is collapsed beyond a predetermined limit and, conversely, air is permitted to escape from the bag as the bag is expanded beyond a predetermined limit.

In view of the foregoing, it should readily be apparent that the air spring unit 10 provides a practical solution to problems resulting from space limitations encountered as an air bag is employed in suspension systems mounted on live axles.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In combination with a suspension system for the frame of a wheeled vehicle characterized by a load supporting axle and a cantilevered leaf spring assembly mounted on the axle, an improved air spring unit comprising:
   A. a pressurizable air bag disposed in substantial vertical alignment with the axle;
   B. a pivotal rocker arm having one end vertically supported by said air bag and one end vertically supported by a projected end portion of said cantilevered support assembly;
   C. means for connecting said rocker arm in supporting relation with said frame including a bracket affixed to said frame and depending therefrom, and a horizontally oriented pin pivotally connecting the rocker arm to the bracket; and
   D. means including a pneumatic circuit connected with said air bag, including a leveling valve connected with said rocker arm, for variably pressurizing said air bag as pivotal motion is imparted to the arm.

2. The air spring unit of claim 1 wherein said arm includes a shoe disposed in sliding engagement with the projected end portion of the leaf spring assembly.

* * * * *